Sept. 20, 1927.

C. F. COWDREY 1,643,151

TORQUE MEASURING MACHINE

Filed Sept. 26, 1925   2 Sheets-Sheet 1

INVENTOR:
Charles F. Cowdrey
BY
ATTORNEY

Sept. 20, 1927.
C. F. COWDREY
1,643,151
TORQUE MEASURING MACHINE
Filed Sept. 26, 1925
2 Sheets-Sheet 2
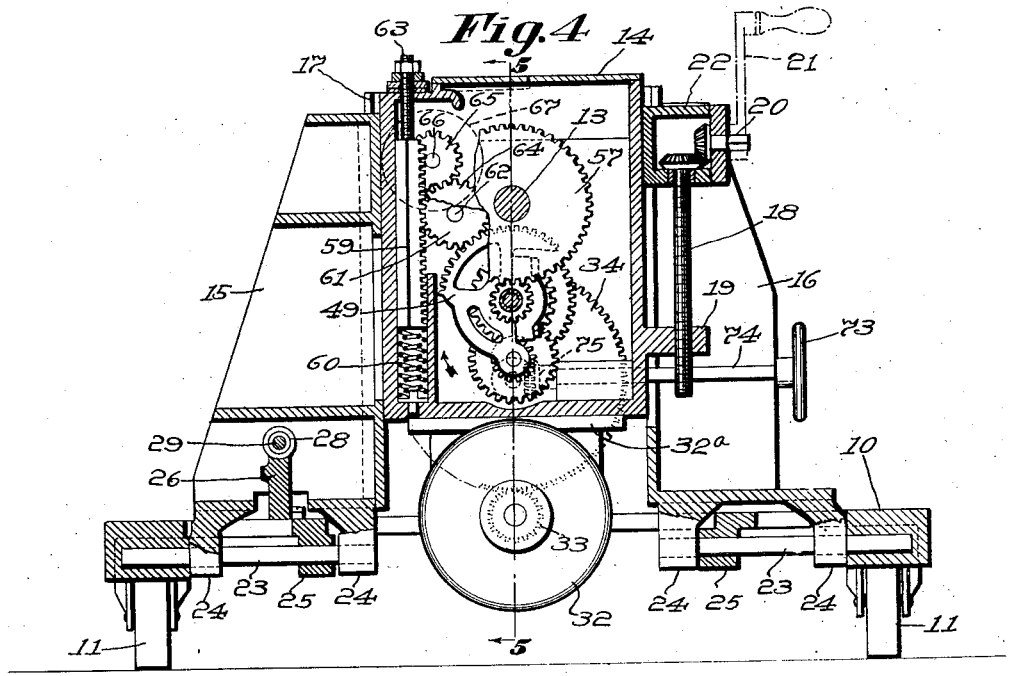
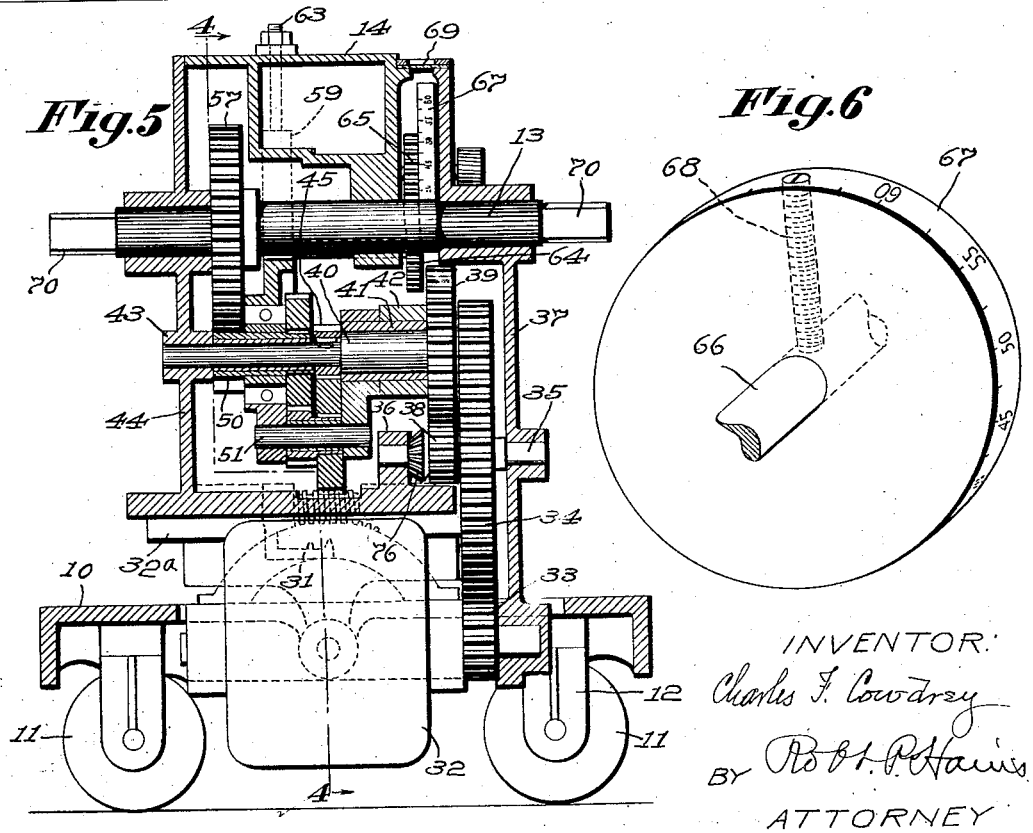
INVENTOR:
Charles F. Cowdrey
BY Robt. P. Harris
ATTORNEY Patented Sept. 20, 1927.

1,643,151

UNITED STATES PATENT OFFICE.

CHARLES F. COWDREY, OF FITCHBURG, MASSACHUSETTS.

TORQUE-MEASURING MACHINE.

Application filed September 26, 1925. Serial No. 58,776.

This invention relates to a machine for measuring the force applied to a shaft or other device to rotate the same.

The present invention has a large range of uses and may be employed in various fields where it is desired to measure the force required to rotate a particular object.

One field of use for the present invention is to determine the force required to rotate the crank shaft of an automobile engine or other internal combustion engine. It might be also used in a factory to determine the force required to turn a line-shaft or to drive a particular machine.

It is also well adapted to measure horsepower, and may be used for many other purposes.

Devices known as dynamometers have been proposed heretofore to measure power, and while these devices have been given various forms, they usually employ a spring or springs to form a driving connection between aligned shafts that are arranged so that one may turn thru a small angle relatively to the other as the load or driving force increases. These proposed devices are open to the objection that it is difficult to devise a satisfactory indicator that will be actuated by the rotative movement of one shaft relatively to the other under the turning torque.

The present invention is therefore directed to a construction in which the driving force is transmitted to the main shaft by a series of gears one of which is supported for yielding movement under varying loads, and this yielding movement serves to operate an indicating device. In this manner the difficulty experienced heretofore in designing a satisfactory indicator that is actuated by the relative movement of two rotating shafts is avoided.

One important feature of the present invention resides in the driving mechanism by which one gear is supported for movement bodily thru an arc of a circle about the axis of another gear under varying loads, and in means actuated by said movement to indicate the force applied. Another feature of the invention resides in the construction by which either end of the main driving shaft may be secured to the device to be tested to rotate the same in one direction or the other. Another feature resides in the construction of the supporting frame by which the main shaft may be adjusted to different positions to align its axis with the device to be driven.

Other features of the invention and novel combination of parts in addition to the above will be hereinafter described in connection with the accompanying drawings which illustrate one good, practical form of the invention.

In the drawings:—

Fig. 1 is a perspective view of a complete torque measuring machine constructed in accordance with the present invention.

Fig. 2 on an enlarged scale is a vertical sectional view thru a series of gears to be described.

Fig. 3 on a smaller scale is a perspective view of the gears shown in Fig. 2.

Fig. 4 is a vertical sectional view taken on the line 4—4 of Fig. 5.

Fig. 5 is a sectional view taken on the line 5—5 of Fig. 4; and

Fig. 6 is an enlarged perspective view of the indicating wheel to be described.

Figure 1:
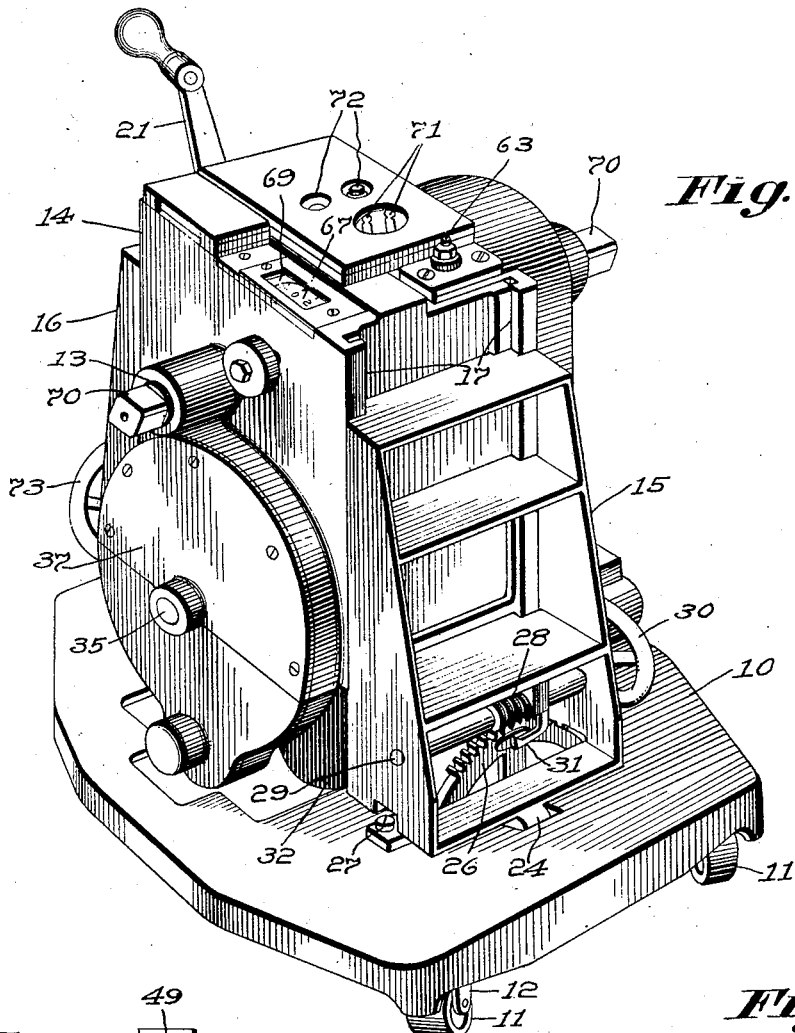
Figure 2:
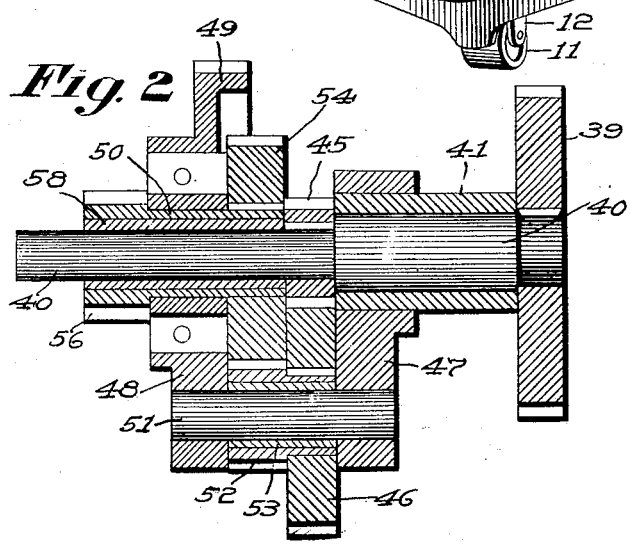
Figure 3:
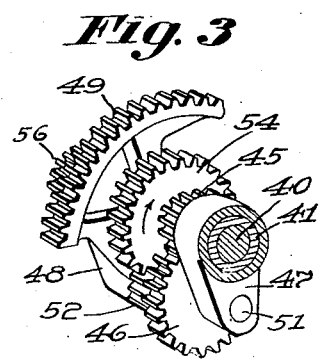

In order that the torque measuring machine of the present invention may be readily moved from one place to another, the machine to be described is shown as mounted upon a truck 10 having the supporting rollers 11 which may be secured to the truck by the castors 12. It is desirable that the main shaft of the machine be mounted so that it may be raised or lowered to align the same with the device to be rotated thereby, and to this end the main shaft 13 is rotatably supported by a casing 14 and this casing is slidably mounted between the upstanding columns 15 and 16, the lower ends of which are pivotally secured to the truck 10 for a purpose to be described.

In the construction shown, the opposite sides of the casing 14 are provided with the spaced slots 17 adapted to receive a correspondingly shaped dove-tailed portion upon the upright columns 15 and 16, the arrangement being such that a strong, rigid connection is formed between the sides of the casing 14 and the supporting uprights, while at the same time the casing may be adjusted in a vertical direction thruout a substantial distance, and the means for raising and lowering the casing 14 may take the form of a vertical threaded shaft 18 (see Fig. 4), the upper end of which is rotatably supported by the column 16, and the threaded portion of which engages a threaded lug 19 projecting from a side wall of the casing 14. The threaded shaft 18 may be rotated by the stub shaft 20 provided with the crank handle 21, and the inner end of this stub shaft is provided with a bevel gear mounted within the box 22 and which meshes with and drives a bevel gear secured to the upper end of the shaft 18.

In the various uses of the present device it may be desirable not only to raise and lower the main driving shaft 13, but also to tilt the same at an inclination to the horizontal position in which it is shown, and to this end the lower ends of the columns 15 and 16 are pivotally secured to the truck 10 by transversely extending pins 23 which extend thru lugs 24 formed at the base of the columns and are supported by lugs 25 upon the truck. As a result of this construction the columns 15 and 16 may be rocked about the pivot pins 23 in a direction transversely to the length of the truck 10 and in order that the columns may be readily tilted to the desired inclination, adjusting means is provided consisting of a toothed arcuate bracket 26 the ends of which are bolted to the upper face of the truck at 27, and a worm 28 mounted upon a transversely extending shaft 29 journaled in the opposite sides of the column 15 meshes with the teeth of the bracket 26. The shaft 29 and worm secured thereupon may be rotated by a hand wheel 30 to swing the columns 15 and 16 to the desired inclination about the pivot pins 23, and the adjustment of the columns may be indicated by the pointer 31 positioned to cooperate with graduations on the face of the bracket 26.

In the construction shown the main shaft 13 is driven by an electric motor 32, the supporting flange 32ª of which is secured to the under face of the casing 14. The central shaft of the motor 32 is provided with the driving pinion 33 which meshes with the large gear 34 that is rigidly secured to the shaft 35, one end of which is journaled in a lug 36 within the casing 14, and the other end is journaled within a lug formed in the outer wall of the housing 37 for the gear 34. The shaft 35 has rigidly secured thereto the pinion 38 which meshes with and drives the gear 39 that is keyed or otherwise secured to the shaft 40. One end of this shaft is journaled in the sleeve 41 which is non-rotatably supported by the bracket 42 of the casing 14, and the other end of this shaft is journaled in a boss 43 formed upon the wall 44 of the casing. The shaft 40 is provided with a driving pinion 45 keyed or otherwise secured thereto.

As above stated, an important feature of the present invention resides in the arrangement of the driving gears by which one is permitted to partake of a swinging movement as the load increases, and of the means whereby this swinging movement serves to operate an indicating device. The construction shown to this end consists of the gear 46 which meshes with the pinion 45 and is supported by the spaced swinging arms 47 and 48, so that the gear 46 moves bodily about the axis of the shaft 40 thru a limited angle. The upper portion of the arm 47 is journaled upon the fixed sleeve 41 and the upper portion of the arm 48 has the form of a segmental gear 49 to be described, and is mounted upon the long sleeve 50 surrounding the shaft 40. The gear 46 is rotatably supported by the stub shaft 51 the opposite ends of which are secured in the spaced arms 47 and 48 and this gear has a pinion 52 rigidly secured thereto, and in order to reduce the wear between the gears just mentioned and the shaft 51 a sleeve of brass or the like 53 may be provided between the shaft and the gears 46 and 52. The pinion 52 meshes with and drives the gear 54 journaled upon the shaft 40 and this gear is rigidly secured to the long sleeve 50 which is secured to or is formed integral with a pinion 56. The pinion 56 meshes with and drives the large gear 57 which is keyed or otherwise secured to the main shaft 13. In the construction shown a sleeve 58 is provided between the shaft 40 and the long sleeve 50 to reduce the friction therebetween.

From the construction just described it will be seen that power is transmitted from the motor 32 to the main shaft 13 thru the various gears described, and that an increase in the power transmitted by these gears will tend to cause the floating or swinging gear 46 to move around the axis of the shaft 40 in a clockwise direction, viewing Fig. 4. The swinging movement of the gear 46 in this direction is resisted, in the construction shown, by a rack 59 supported in the casing 14 for vertical sliding movement, and at the lower end of which is provided the coiled spring or springs 60 mounted in a socket formed in the casing 14. A gear 61 rigidly secured to a long shaft 62 supported by the casing, meshes with the rack 59 and also with the teeth of the segmental gear 49, the arrangement being such that rocking movement of the segmental gear in a clockwise direction serves to force the rack downwardly to compress the springs 60. The movement of the rack 59 in an upward direction may be limited by the stop bolt 63 that may be secured in the desired position of adjustment by tightening the nuts at the upper end of this bolt.

From the foregoing it will be seen that the rocking movement of the stub shaft 51 and gears mounted thereupon in a clockwise direction is resisted by the compressed springs 60. In order that this rocking movement may serve to operate an indicator, the long shaft 62 is provided with a gear 64 secured thereto near its right-hand end, viewing Fig. 5, and this gear 64 meshes with and drives a gear 65 secured to the shaft 66 upon which the indicator disk or wheel 67 is mounted. The indicator disk 67 is secured to the shaft 66 in the desired position of angular adjustment by tightening the set screw 68, and this disk is so positioned that its graduations may be observed thru the window 69 provided in the upper face of the casing 14.

The construction described will serve to rotate the shaft 13 in one direction, but not the other, but it may be desirable to rotate the device to be tested in either a right-hand or left-hand direction. The main driving shaft 13 is therefore constructed so that both of its ends project from the casing 14 and are squared as at 70 so that either end of the shaft may be placed in driving engagement with the device to be rotated. As a result of this construction, if a shaft of a machine to be tested is to be rotated in one direction, one end of the shaft 13 will be secured thereto, and if the shaft is to be driven in an opposite direction, the other end of the main shaft 13 will be placed in driving engagement therewith. In the construction shown, current may be supplied to the electric motor 32 by securing an electric plug to the contact pins 71 at the upper face of the casing 14 and the motor may be started and stopped by operating the switch buttons 72 mounted in the upper end of the casing.

In the device shown a relatively small motor 32 is employed to drive the main shaft 13, and a number of reducing gears are interposed between the driving motor and main shaft so that the latter is rotated at a relatively low speed, but obviously, if it is desired to drive the main shaft 13 at a higher speed, a stronger motor may be employed, in which case a number of the reducing gears shown may be dispensed with. In some cases it may be desirable to rotate the shaft 13 by hand thru a small angle in order to bring its squared end 70 in alignment with the socket into which it may be inserted. A hand wheel 73 secured to the transversely extending shaft 74 journaled in the lower portion of the casing 14 is therefore provided, and has a bevel gear 75 at its inner end which meshes with a bevel gear 76 secured to the shaft 35, the arrangement being such that rotation of the hand wheel 73 will slowly rotate the main shaft 13.

What is claimed is:—

1. A torque measuring machine, comprising in combination, a supporting frame, a main shaft rotatively supported by the frame, driving means for said shaft including power transmitting mechanism, a rack slidably supported by said frame, a gear meshing with said rack to shift it and associated with said power transmitting mechanism to be actuated by the variations in the turning torque applied to said shaft, a spring for opposing the shifting movement imparted to the rack by said gear, indicating means actuated by said driving mechanism to indicate the turning force applied to the main shaft, and adjustable means for regulating the tension of said spring.

2. A torque measuring machine, comprising in combination, a supporting frame, a main shaft rotatively supported by the frame, driving means for said shaft including power transmitting mechanism, a rack slidably supported by said frame, yielding means for opposing the sliding movement of the rack, a gear meshing with the rack to shift it and associated with said power transmitting mechanism to be actuated by the variations in the turning torque applied to said shaft, indicating means actuated by said driving mechanism to indicate the turning force applied to the main shaft, and an adjustable stop for said rack and adapted to be adjusted to vary the force exerted upon the rack by the yielding means.

3. A torque measuring machine, comprising in combination, a supporting frame, a main shaft rotatively supported by the frame, a driving motor, a train of gears between the motor and main shaft to drive the shaft at reduced speed and including a floating gear adapted to move in the arc of a circle about the gear with which it meshes as the force transmitted by the gears varies, yielding means for opposing the arcuate movement of said gear, means actuated by the movement of said gear to indicate the turning force applied to the main shaft, and manually operable means for rotating the train of gears to turn said shaft through a small angle.

4. A torque measuring machine, comprising in combination, a supporting frame, a main shaft rotatively supported by the frame, driving means for said shaft including a train of gears one of which is mounted for floating movement in the arc of a circle about the gear with which it meshes as the force transmitted by the gears varies, yielding means for opposing the arcuate movement of said gear, an indicator, means for actuating the indicator in response to the yielding movement of said gear to indicate the turning force applied to the main shaft, and means for securing the indicator adjustably to its actuating means to facilitate adjustment of the reading of the indicator.

5. A torque measuring machine, comprising in combination, a supporting casing, a main shaft supported by the casing, a driving motor for said shaft, a train of gears within said casing for driving the shaft from the motor and one of the gears being mounted for floating movement in the arc of a circle about the gear with which it meshes as the force transmitted by the gears varies, yielding means for opposing the arcuate movement of said gear, an indicator, means for actuating the indicator in response to the yielding movement of said gear to indicate the turning force applied to the main shaft, and an electric switch associated with said casing for starting and stopping the driving motor.

6. A torque measuring machine, comprising in combination, a supporting base, a pair of columns mounted upon said base in spaced relation to each other, a casing slidably mounted between the columns for sliding adjustment and having a dove-tailed sliding connection with each column that constitutes a strong bracing connection between them, a main shaft rotatably supported by the casing, driving means for said shaft including a train of gears one of which is mounted for floating movement in the arc of a circle about the gear with which it meshes as the force transmitted by the gears varies, yielding means for opposing the arcuate movement of said gear, an indicator, and means for actuating the indicator in response to the yielding movement of said gear to indicate the turning force applied to the main shaft.

7. A torque measuring machine, comprising in combination, a supporting base, a pair of columns mounted upon said base in spaced relation to each other and for angular adjustment relatively to the base, a casing slidably mounted between the columns for sliding adjustment and having a dove-tailed sliding connection with each column and which constitutes a strong stiffening connection between the adjustable columns adapted to hold them in alignment with each other, a main shaft rotatably supported by the casing, driving means for said shaft including a train of gears one of which is mounted for floating movement about the gear with which it meshes as the force transmitted by the gears varies, yielding means for opposing the movement of said gear, an indicator, and means for actuating the indicator in response to the yielding movement of said gear to indicate the turning force applied to the main shaft.

8. A torque measuring machine, comprising in combination, a supporting base, a pair of columns mounted upon said base in spaced relation to each other, a casing slidably mounted between the columns for sliding adjustment, means for pivotally securing the columns to said base for adjustment to different inclinations upon the base, graduated means for indicating the angular adjustment of the columns, a main shaft rotatably supported by the casing, driving means for said shaft including a series of gears one of which is mounted for floating movement about the gear with which it meshes as the force transmitted by the gears varies, yielding means for opposing the movement of said gear, an indicator, and means for actuating the indicator in response to the yielding movement of said gear to indicate the turning force applied to the main shaft.

9. A torque measuring machine, comprising in combination, a supporting frame, a main shaft rotatably supported by the frame, driving means for the shaft including a motor, a series of gears for driving the shaft from the motor including a large gear and a small gear rigidly secured together, means for supporting said large and small gears to move in an arcuate path about the axis of the gears with which they cooperate as the load transmitted by the gears varies, yielding means for resisting the arcuate movement of said gears, indicator means, and means for actuating the indicator in response to the movement of the last mentioned gears to indicate the turning force applied to the main shaft.

10. A torque measuring machine, comprising in combination, a driving motor, a series of gears driven by the motor, a shaft having two gears of said series mounted thereupon, a second shaft extending parallel to the first, means for supporting the second shaft for movement in the arc of a circle about the first shaft, two rigidly connected gears journaled upon said second shaft for transmitting power from one of the gears upon the first shaft to the other; yielding means for resisting the swinging movement of said second shaft, an indicator, means for actuating the indicator in response to said swinging movement, and a main shaft driven by said series of gears.

In testimony whereof, I have signed my name to this specification.

CHARLES F. COWDREY.